United States Patent [19]

Thoma et al.

[11] Patent Number: 4,606,974

[45] Date of Patent: Aug. 19, 1986

[54] LEVELLER-CONTAINING HIGH-SOLIDS POLYURETHANE REACTIVE COATING SYSTEMS AND THEIR USE FOR REACTIVE COATING

[75] Inventors: Wilhelm Thoma, Leverkusen; Karl H. Pisaric, Pulheim; Heinrich Alberts, Odenthal, all of Fed. Rep. of Germany

[73] Assignee: Bayer Aktiengesellschaft, Leverkusen, Fed. Rep. of Germany

[21] Appl. No.: 799,090

[22] Filed: Nov. 18, 1985

Related U.S. Application Data

[62] Division of Ser. No. 542,283, Oct. 14, 1983, Pat. No. 4,571,417.

[30] Foreign Application Priority Data

Oct. 28, 1982 [DE] Fed. Rep. of Germany ....... 3239900

[51] Int. Cl.$^4$ ............................................... B32B 9/04
[52] U.S. Cl. ..................................... 428/447; 525/63; 525/101; 428/425.5; 428/429; 428/473; 428/480; 428/423.1
[58] Field of Search .................. 525/63, 101; 428/447, 428/425.5, 429, 473, 480

[56] References Cited

U.S. PATENT DOCUMENTS 4,248,756 2/1981 Konig et al. .................. 260/31.2 N
4,363,686 12/1982 Komarek .............................. 156/242
4,571,417 2/1986 Thoma et al. ........................ 525/101

*Primary Examiner*—Melvyn I. Marquis
*Attorney, Agent, or Firm*—Gene Harsh; Joseph C. Gil; Thomas W. Roy

[57] ABSTRACT

The present invention is directed to a high-solids polyurethane reactive coating system based on blocked NCO-prepolymers, polyamines and, optionally, solvents, said coating system containing a leveller agent comprising (1) a combination of from about 1 to 10% by weight of (A) vinyl polymers and copolymers based on (meth)acrylic acid esters and, optionally, other comonomers and from about 0.1 to 2% by weight of (B) polysiloxanes and/or polyalkylene oxide/polysiloxane copolymers, (2) from about 0.2 to 2.0% by weight of (C) poly(meth)acrylic acid (hydroxy)alkyl ester graft polymers on silicones, (3) mixtures of (A), (B) and (C) in the amounts specified, (4) mixtures of (A) and (C) in the amounts specified or (5) mixtures of (B) and (C) in the amounts specified.

The present invention also relates to textile substrates coated on one or both sides or surface-textured sheet-form materials, particularly velour leather, coated with the above leveller-containing, high-solids polyurethane reactive coating systems.

20 Claims, No Drawings

LEVELLER-CONTAINING HIGH-SOLIDS POLYURETHANE REACTIVE COATING SYSTEMS AND THEIR USE FOR REACTIVE COATING

This application is a division of application Ser. No. 542,283 filed Oct. 14, 1983, now U.S. Pat. No. 4,571,417.

BACKGROUND OF THE INVENTION

1. Field of the Invention

The present invention is directed to leveller combinations based on poly(meth)acrylic acid esters and silicones for high-solids polyurethane reactive coating systems containing blocked isocyanate-terminated prepolymers and polyamines.

2. Description of the Prior Art

High-solids PU reactive systems of blocked NCO-prepolymers which are reacted with preferably aliphatic and/or cycloaliphatic polyamines in the coating process to form polyurethane ureas, the blocking agent being eliminated on heating, are known. The production of systems such as these and the coating of textile substrates by the transfer and direct coating processes are described, for example, in DE-A No. 2,902,090 (EP-A No. 13,890), according to which the coating systems may also contain levelling aids, such as polydimethyl siloxanes or polyoxyalkylene/polydimethyl siloxane copolymers.

The difficulties in the form of blisters, bubbles and levelling faults encountered in the direct coating of blocked, high-solids, PU reactive systems onto textile substrates, such as woven fabrics, knitted fabrics and nonwovens of a variety of fiber materials, particularly on both sides, are avoided by the process according to the present invention.

The process according to the invention for coating textile substrates on one and, more particularly, both sides or for mold copying with blocked high-solids NCO prepolymers, the reactive systems being cross-linked with polyamines, is characterized by the simultaneous addition of vinyl polymers and polysiloxanes and/or vinyl graft polymers based on polysiloxanes as levelling and homogenizing agents.

The effect of blister-free and bubble-free coatings obtained by these combined additions, particularly in the case of two-sided coating with high-solids PU reactive systems, was surprising and was not suggested by any previous experience or by any disclosures in the literature. The favorable levelling behavior of the high-solids PU reactive systems is also of advantage in the coating of molds, for example for the production of velour leather in accordance with German Pat. No. 3,004,327.

SUMMARY OF THE INVENTION

The present invention is directed to a high-solids polyurethane reactive coating system based on blocked NCO-prepolymers, polyamines and, optionally, solvents, said coating system containing a leveller agent comprising (1) a combination of from about 1 to 10% by weight of (A) vinyl polymers and copolymers based on (meth)acrylic acid esters and, optionally, other comonomers and from about 0.1 to 2% by weight of (B) polysiloxanes and/or polyalkylene oxide/polysiloxane copolymers, (2) from about 0.2 to 2.0% by weight of (C) poly(meth)acrylic acid (hydroxy)alkyl ester graft polymers on silicones, (3) mixtures of (A), (B) and (C) in the amounts specified, (4) mixtures of (A) and (C) in the amounts specified or (5) mixtures of (B) and (C) in the amounts specified.

The present invention also relates to textile substrates coated on one or both sides or surface-textured sheet-form materials, particularly velour leather, coated with the above leveller- containing, high-solids polyurethane reactive coating systems.

DETAILED DESCRIPTION OF THE INVENTION

The constituents of the levelling aids according to the invention are (A) vinyl polymers, particularly esters of polyacrylic and/or polymethacrylic acids with straight-chain or branched or cyclic alcohols, $C_1$–$C_{18}$-alcohols preferably being used as the esterification component. The vinyl polymers may also be copolymers of acrylic acid and/or methacrylic acid esters and comonomers, such as acrylic acid, methacrylic acid and their amides, vinyl acetate, styrene, acrylonitrile and other vinyl compounds. The comonomers apart from acrylic and/or methacrylic acid esters are present in small quantities, for example in quantities of less than about 40% and preferably in quantities of less than about 20%. The polyacrylic and/or polymethacrylic acid esters are generally present in the form of about 10 to 70% solutions and, more particularly, in the form of about 30 to 50% solutions. Suitable solvents are petroleum fractions, esters of acetic acid, propionic acid or butyric acid (for example ethyl acetate, butyl acetate, ethylene glycol monomethyl ether acetate, ethylene glycol monoethyl ether acetate) or ketones, such as methyl ethyl ketone, diethyl ketone, cyclohexanone or methyl cyclohexanone.

The liquid polysiloxanes (silicones) used as component (B) are polyalkyl and/or polyphenyl siloxanes, particularly polydimethyl siloxanes or even polyoxyalkylene/polydimethyl siloxane copolymers ("polyether silicones").

The viscosity of these polysiloxanes in diluted form is in the range from about 100 to 50,000 mPa.s/25° C. and, more particularly, in the range from about 500 to 5,000 mPa.s.

The polymethyl siloxanes and polymethyl phenyl siloxanes are known compounds and are described, for example, in the company publication entitled Baysilon-Ole-M, Polymere dimethyl-polysiloxane, Bayer AG, Sparte AC, Order No. AC 12 209 of 1.2.1980 and in another company publication entitled Baysilon-Ole-P, Polymere Methylphenylsiloxane, Order No. AC 12 023, Edition 2/80.

The "polyether silicones" used in accordance with the invention are linear, but preferably branched or comb-like polyoxyalkylene/poly(di)alkyl siloxane copolymers, preferably polyoxyalkylene/dimethyl siloxane copolymers which contain both a hydrophilic (polyether) and a hydrophobic (siloxane) section in the molecule. The polyoxyalkylene ether makes up from about 20 to 90% by weight and preferably from about 40 to 87.5% by weight and the silicone from about 80 to 10% by weight and preferably from about 60 to 12.5% by weight.

The polyoxyalkylene ether part contains at least 20 to about 80% by weight and preferably about 40 to 70% by weight of oxyethylene groups. The other oxyalkylene residues may consist of oxyalkylene groups containing from 3 to 10 carbon atoms, preferably oxypropylene or oxybutylene residues. However, the particularly preferred residue is the oxypropylene residue

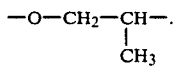

The chain lengths of the polyoxyalkylene segments in the polyether silicone are preferably equivalent to a molecular weight of $\geq 400$ per polyoxyalkylene chain. The oxyalkylene segments may be made up purely of oxyethylene and oxypropylene segments or, less preferably, may be formed by relatively short mixed segments. The ends of a polyether chain may be closed by a monofunctional residue, for example the butoxy residue or methoxy ethoxy residue.

The poly(di)alkyl siloxane part of the "polyether silicones" may consist for example of (di)methyl siloxane, (di)ethyl siloxane, (di)amyl siloxane and other (di)alkyl siloxane residues. Poly(di)methyl siloxane residues are preferably the predominant members of the siloxane chain.

Some of the dialkyl siloxane residues may be replaced by

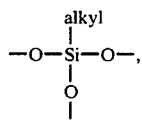

for example in the case of the (preferred) trifunctional silicone residues by a

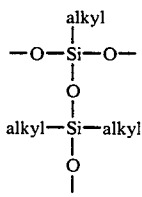

residue, or, in the case of organofunctional residues, by a

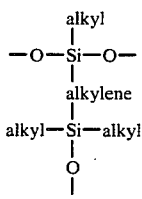

residue or even by a

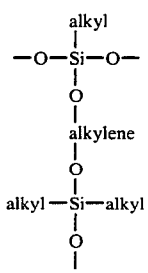

residue.

Branching or modifying residues such as these (for example residues giving organofunctional linkages) are commonplace in the field of silicone chemistry. Similarly, the terminal groups are generally the

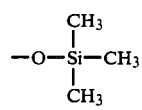

group.

Allowance is made for modifying groups such as these in the designation "(di)alkyl siloxane"-group.

Corresponding synthesis reactions by which polyether silicones of the type in question are formed are described in W. Noll's book entitled "Chemie und Technik der silikone", Verlag Chemie, Weinheim, 2nd Edition, 1968, pages 321 to 323. The following are examples of polyether silicones which have been subjected to comb-like modification with polyether segments (V) or of branched polyether silicones which have been subjected to terminal modification with polyether segments (VI):

Silicones subjected to comb-like modification (V):

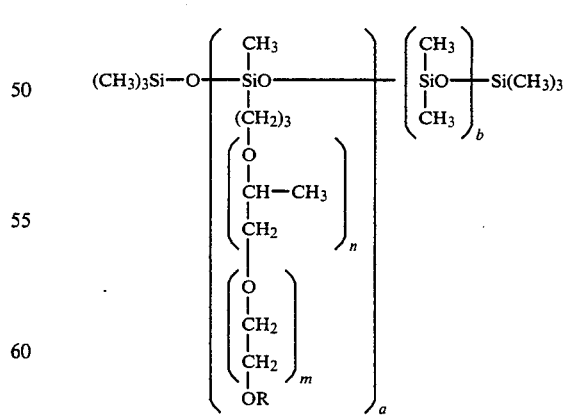

(in which (a) and (b) are integers and n and m are integers so that the oxyalkylene ether segments make up from about 20 to 90% by weight);

Terminally modified silicone (VI):

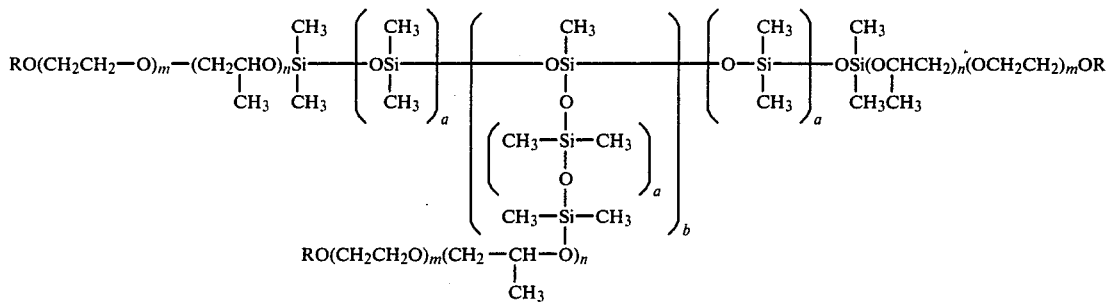

in which (a) and (b) and also (m) and (n) are integers and correspond to such values that (on average) the specified oxyalkylene ether and dimethyl siloxane contents are reached and the percentage contents of the oxyethylene ether segments are in the region of the specified values.

Compounds such as these are described in the Company Publication entitled "Goldschmidt informiert", No. 24 (3/1973), Goldschmidt AG, Essen, cf. page 3 where literature references on the production of polyether siloxanes of the type in question and their properties are also cited.

The production and structures of polyether siloxane copolymers of the type in question are described, for example, in the following patents: DE-B No. 1,444,316 (U.S. Pat. No. 3,562,786), DE-B No. 1,040,251 (U.S. Pat. No. 2,834,748), DE-B No. 1,233,133, U.S. Pat. No. 2,917,480, U.S. Pat. No. 3,629,308, GB-PS No. 1,006,784, DE-B No. 1,545,110 and EP-A No. 25,822.

The polyether silicones generally have molecular weights in the range from about 3000 to 50,000 and preferably in the range from about 6000 to 20,000.

The silicones (B) may be added to the high solids PU reactive coating pastes in undiluted or diluted form. Suitable diluents or solvents are, for example, aromatic hydrocarbons, such as toluene, esters such as ethylacetate, ethylene glycol monomethyl or monoethyl ether acetate or ketones such as acetone or methyl ethyl ketone. Alcohols, aqueous alcohols and water may also be used for dissolving the polyether silicones, in which case the concentrations of (B) are in the range from about 20 to 100%.

The vinyl graft polymers on silicones used in accordance with the invention as (C) are obtained by the graft polymerization of acrylic acid and/or methacrylic acid esters, for example butyl acrylate or methyl acrylic acid methyl ester, onto silicones and, more particularly, by grafting onto mixtures of dimethyl polysiloxanes containing vinyl residues and SiH-containing dimethyl polysiloxanes. The percentage of polyacrylate grafted on in the graft polymer is generally between about 5 and 50% and, more particularly, between about 20 and 40% by weight. The graft polymers (C) are advantageously incorporated in undiluted form in the high-solids PU reactive coating pastes. However, they may also be diluted with solvents, such as methyl glycol acetate, or dispersed in water, in which case the concentration is between about 20 and 100% by weight.

The quantity in which the levelling agents are used—based on the solids content of the high-solids PUR reactive coating pastes—amounts to between about 1 and 10% by weight and preferably between about 2 and 5% by weight of (A); between about 0.1 and 2.5% by weight and preferably between about 0.2 and 1.0% by weight of (B) and/or between about 0.1 and 4% by weight and preferably between about 0.2 and 2.0% by weight of graft polymer based on silicones (C). The total quantity of levelling aids preferably amounts to at most 8% by weight. It is preferred to use a combination of (A) and (B) or the combined grafted polymer (C) per se. It is further intended to use a combination of (A)+(B)+(C). It is however also intended to use the combined grafted polymer (C) together with either the vinyl (co)polymers (A) or the silicones (B) in order to obtain the desired properties for the particular end use.

Reactive coating is generally carried out by reacting NCO-prepolymers containing blocked NCO-groups and substantially nonvolatile aliphatic and/or cycloaliphatic diamines, preferably alkyl-substituted dicyclohexyl methane diamines. Corresponding processes are described, for example in DE-A Nos. 2,814,079, 2,814,173, 2,902,090, 3,120,596 and in German Pat. No. 3,004,327.

The NCO-prepolymers are reaction products of relatively high molecular weight, difunctional to tetrafunctional and preferably difunctional to trifunctional polyhydroxyl compounds having a molecular weight of from about 500 to 10,000 and preferably from about 1000 to 6000. They are preferably the known starting materials normally used for coating with polyurethane systems, for example difunctional to tetrafunctional polyethers, such as polytetramethylene ether, but preferably polyoxypropylene polyethers which may also contain polyoxyethylene units in block, mixed or terminal form in quantities of up to about 80% of all oxyalkylene units, and also polyesters melting at temperatures below 60° C. and the polythioethers, polycarbonates, polyacetals or lactone polyesters otherwise normally used as well as their mixtures or even co-condensation products containing ether, ester, amide, carbonate or acetal groups.

Polyhydroxyl compounds containing high molecular weight polyadducts or polycondensates or vinyl polymers in finely dispersed or even dissolved form may be used, optionally in admixture with unmodified polyols, as relatively high molecular weight polyhydroxyl compounds. Examples of these compounds are, in particular, polyethers, polyesters or polycarbonates containing approximately 8 to 40% by weight of dispersed or dissolved polyaddition products of diisocyanates and either diols or more preferably diamines (including hydrazine or dihydrazide compounds). Polyethers, polyesters or polycarbonates containing from about 8 to 40% by weight of polymers (for example through the graft polymerization of acrylonitrile and styrene) may also be used. Low molecular weight polyols having a molecular weight of from 62 to 399 and preferably from 62 to about 250 of the type known per se as chain-extending agents may also be used in the production of the NCO-prepolymers according to the invention, preferred compounds of this type are 1,4- or 2,3- or 1,3-butane diol, diethylene glycol, di-2-hydroxyethyl sulfide, dianhydrosorbitol or trimethylol propane. Suitable relatively high molecular weight and low molecular weight polyhydroxyl compounds which fall within this molecular weight range are described in detail in DE-A No. 2,854,834 (U.S. Pat. No. 4,251,003, herein incorporated by reference).

The polyisocyanates used may be the aliphatic, cycloaliphatic and aromatic polyisocyanates mentioned in DE-A No. 2,854,834 (U.S. Pat. No. 4,251,003, previously incorporated by reference), although aromatic polyisocyanates are preferably used. According to the invention, it is preferred to use diphenyl methane diisocyanates in the form of their 4,4'-, 2,4'- and/or 2,2'-isomers or mixtures thereof and also isomeric tolylene diisocyanates and, in particular, mixtures of these isocyanates. Among the cycloaliphatic diisocyanates, dicyclohexyl alkane diisocyanates and isophorone diisocyanate are particularly preferred.

The NCO-prepolymers are produced in known manner by reacting the above-mentioned polyhydroxyl compounds with excess diisocyanates, preferably at an NCO/OH ratio of from about 1.5:1 to 6.0:1 and preferably from about 1.7:1 to 2.5:1. The NCO-prepolymers used have an NCO content of about 1.8 to 8%, preferably about 2.0 to 6% and, more preferably about 2.1 to 5% by weight of NCO groups.

Suitable blocking agents for the NCO-prepolymers are phenols, malonic esters, acetoacetic esters, caprolactam and similar compounds known for blocking reactions, although it is preferred to use $C_2$–$C_8$-alkanone oximes, of which butanone oxime is particularly preferred.

Blocking is carried out by reacting the NCO-prepolymer with substantially stoichiometric quantities of the blocking agent, particularly butanone oxime, until the NCO group has disappeared. It is also possible to use blocked NCO-prepolymers in which not all the NCO-groups are blocked, i.e. in which about 1 to 25% of the NCO groups are still free.

In order to adjust the optimum processing viscosity which is in the range from about 15,000 to 40,000 mPa.s at 20° C., the blocked NCO-prepolymers may be mixed with up to about 50% by weight, preferably with up to about 15% by weight and, more preferably, with up to about 10% by weight, based on the blocked NCO-prepolymer, of organic solvents, such as for example isopropanol, ethylene glycol monomethyl ether and its acetic acid ester, methyl ethyl ketone, cyclohexanone, butyl acetate and DMF.

The coating pastes may also contain standard additives, such as dyes and pigments, thickeners, such as silica, chalk, talc, kaolin, glass powder or short fibers, UV-absorbers, antioxidants, light or heat stabilizers, stabilizers against discoloration by exhaust gases, such as stabilizers containing tertiary amines or tetraalkyl piperidine derivatives, and even standard polyurethane catalysts.

The crosslinking component for the blocked NCO-prepolymers is selected from substantially nonvolatile aliphatic and/or cycloaliphatic polyamines, preferably (cyclo)aliphatic diamines which are liquid at room temperature and have a low vapor pressure, especially those having a lower vapor pressure than 1,6-hexane diamine. Particularly preferred crosslinking components are dicyclohexyl methane diamines, particularly alkyl-substituted diaminodicyclohexyl methanes, such as for example 4,4'-diamino-3,3'-dimethyldicyclohexyl methane, 4,4'-diamino-3,3'-diethyldicyclohexyl methane, 4,4'-diamino-3,3'-diisopropyldicyclohexyl methane or asymmetrically alkyl-substituted 4,4'-diamino-di-, -tri- or -tetra-alkyl cyclohexyl methanes, such as for example product mixtures of 3,5-diethyl-3',5'-diisopropyl dicyclohexyl methane, 3,5,3',5'-tetraethyl-4,4'-diaminodicyclohexyl methane and 3,5,3',5'-tetraisopropyl-4,4'-diaminodicyclohexyl methane (cf. DE-OS No. 2,920,501) or 3,5,3'-trimethyldodecahydrodiphenyl-4,4'-diamine. It is also possible to use aliphatic diamines such as 1,12-diaminododecane or, preferably a partial amount of higher functional polyamines such as, for example, 1,5,11-triaminoundecane. 4,4'-diamino-3,3'-dimethyl dicyclohexyl methane is particularly preferred. Particularly preferred diamines and reactive coating compositions are described in German Pat. No. 2,902,090/EP-A No. 13,890 (U.S. Pat. No. 4,248,756, herein incorporated by reference).

The blocked NCO-prepolymers are generally mixed with the polyamine crosslinker in approximately stoichiometric amounts although deviation from the stoichiometric ratio is also possible. Therefore, according to the invention the equivalent ratio of blocked NCO to $NH_2$ is generally between about 1.30:1 and 0.95:1, preferably between about 1.25:1 and 0.97:1 and more preferably between about 1.10:1 and 0.98:1. Accordingly, excesses of NCO may be used; whereas, excess amino groups are only tolerable within relatively narrow limits in order to avoid any adverse effect upon the properties.

The textile substrate, for example woven fabrics of polyester fibers, polyamide fibers, glass fibers or natural fibers, may be primed with standard commercial 2-component or 1-component polyurethanes in the form of solutions or dispersions or with PVC preparations before direct coating with the high-solids PUR reactive systems. Coating with the reactive coating composition according to the invention is carried out by methods known per se using conventional coating machines. One particularly important embodiment of the invention, in which the process also shows particularly important effects, is the coating of textile substrates on both sides which, in this case, may be accomplished without any bubbles whatever, even where large quantities of the coating composition are applied. In this preferred embodiment, the coating composition is applied to each side in quantities of $\geq 100/gm^2$ and preferably in quantities of from 100 to about 1000 g/m².

The invention is further illustrated, but is not intended to be limited by the following examples in which all parts and percentages are by weight unless otherwise specified.

EXAMPLES

Production of the Blocked NCO-Prepolymers

High-Solids Prepolymer A:

4000 g of a hydroxyl polyether based on trimethylol propane and propylene oxide having a molecular weight of 6000 and 275 g of a hydroxyl polyether (molecular weight 550) based on bisphenol A and propylene oxide were reacted at 80° to 90° C. with 375 g of 4,4'-diisocyanato-diphenyl methane and 261 g of 2,4- diisocyanatotoluene until the NCO-content fell just below the calculated value of 2.56%. 261 g of butanone oxime were then stirred into the reaction mixture at 60° to 70° C. After about 20 minutes, it was no longer possible to detect any NCO (IR-spectroscopy). The blocked NCO-prepolymer, a clear colorless liquid having a viscosity of approximately 50,000 mPa.s at room temperature, had a measurable latent NCO-content of 2.34% by weight and hence an NCO-equivalent weight of 1800 g.

High-Solids Prepolymer B:

2000 g of a polyether based on trimethylol propane and propylene oxide having a molecular weight of 6000, 1000 g of a linear polyether based on propylene glycol and propylene oxide having a molecular weight of 1000, 1450 g of a linear polyester (molecular weight 1700) based on 1,6-hexane diol, neopentyl glycol (65:35) and adipic acid and 22.5 g of 1,4-butane diol were reacted for about 3 hours at 80° to 90° C. with 1125 g of 4,4'-diisocyanatodiphenyl methane and 174 g of 2,4-diisocyanatotoluene until the NCO-content had fallen just below the calculated value of 4.26%.

496 g of butanone oxime and 696 g of ethylene glycol monomethyl ether acetate were then rapidly stirred in at 60° to 70° C. After 20 minutes, no more NCO could be detected (IR-spectroscopy). The blocked NCO-prepolymer, a clear colorless liquid having a viscosity of approximately 40,000 mPa.s at room temperature, had a measurable latent NCO-content of 3.3% by weight and, hence, an NCO-equivalent weight of 1280 g.

High-Solids Prepolymer C:

1000 parts by weight of a linear hydroxyl polyester polycarbonate (molecular weight 2000) produced from the ester glycol of ε-caprolactone and 1,6-hexane diol with diphenyl carbonate in accordance with DAS No. 1,770,245 were reacted for about 2 hours at 115° C. with 262 parts by weight of 4,4'-diisocyanatodicyclohexyl methane until the measured NCO-content amounted to approximately 2.9% (calculated 3.3%). The NCO-prepolymer was then cooled to between 70° and 80° C. while 338 parts by weight of ethylene glycol monomethyl ether acetate were added. 87 parts by weight of butanone oxime were rapidly added at that temperature. After the slightly exothermic reaction had abated (about 10 to 20 minutes after addition of the oxime), no more NCO could be detected by IR-spectroscopy. In the form of an 80% solution, the blocked NCO-prepolymer was a colorless, clear liquid with a viscosity of 40,000 mPa.s at 20° C. and had a measurable latent NCO-content of 2.4% and, hence, an NCO-equivalent weight of 1750.

EXAMPLE 1

500 g of the high-solids prepolymer A (NCO-content 2.34%) and 500 g of the high-solids prepolymer B (NCO-content 3.3%) were mixed. 50 g of a 30% solution of a polymethacrylic acid butyl ester in mineral spirits, 5.0 g of a polydimethyl siloxane having a viscosity of 20,000 mPa.s at 25° C., 100 g of dry titanium dioxide pigment and 78.0 g of 3,3'-dimethyl-4,4'-diaminodicyclohexyl amine as crosslinker were added to the resulting mixture. After homogenization, optionally by grinding down on a roll mill, the high-solids PUR reactive coating composition was ready for application.

The coating paste described above was applied to polyester fabric (1100 dtex, weight approximately 200 g/m²) on a coating machine by means of doctor rolls (gap width 0.3 mm). Crosslinking was carried out at 150° to 160° C. with a residence time of 2 minutes to obtain a dry coating weight of 230 g/m². With the gap between the doctor rolls adjusted to 0.1 mm, a first coat was applied to the underneath of the coated fabric web and was crosslinked under the conditions described above. The weight of coating was 80 g/m² and the layer was homogeneous and free from bubbles. With the gap between the doctor rolls adjusted to approximately 0.2 mm, a second coat was applied to the underneath side under the same conditions. On completion of the reaction, the second coat had a weight per unit area of 180 g/m² so that the total weight of the coating on the underneath of the fabric amounted to 260 g/m². The second coat on the underneath was joined firmly to the first coat and, like the first coat, was completely free from holes or bubbles.

A comparative test carried out with a coating paste prepared in the same way as in Example 1, but without addition of the 30% solution of the polymethacrylic acid butyl ester and the polydimethyl siloxane, gave a coating with poor levelling on both sides and with serious crater, hole and island formation on the underneath (second side) of the article. Even the sole addition of polydimethyl siloxane gave coatings characterized by moderate levelling and mechanical faults.

EXAMPLE 2

300 g of the high-solids prepolymer A (NCO-content 2.34%) and 700 g of the high-solids prepolymer B (NCO-content 3.3%) were mixed. 100 g of a 50% solution of a polyacrylic acid ethyl ester in ethyl acetate/methyl glycol acetate (3:2) and 20 g of an ethoxylated polydimethyl siloxane having a viscosity of 1000 mPa.s/25° C. were added to the resulting mixture. 80 g of red-brown iron oxide were incorporated as pigment; 85.0 g of 3,3'-dimethyl-4,4'-diaminodicyclohexyl methane were stirred in as crosslinker.

A nylon fabric (weight approximately 120 g/m²) was coated with this paste on both sides.

Top: 1 coat, dry weight approx. 120 g/m²
Underneath: 1 coat, dry weight approx. 100 g/m²
Crosslinking temperature: 140°-150°-160° C.
Residence time: 2 minutes Both on top and underneath, the coating showed uniform levelling and was free from craters and islands.

EXAMPLE 3

1000 g of the high-solids prepolymer C (NCO-content 2.4%), 40 g of a graft polymer of butyl acrylate on dimethyl polysiloxane (22% of butyl acrylate grafted onto a mixture of 25% of Si-vinyl-containing dimethyl polysiloxane and 53% of SiH-containing dimethyl polysiloxane), 50 g of Al-powder, 80 g of chalk and 68.0 g of 3,3'-dimethyl-4,4'-diaminodicyclohexyl methane were homogenized to form a coating paste.

A glass cloth (weight 300 g/m²) was coated on both sides with the coating paste of Example 3.

Top: 2 coats:
    1st coat, weight approx. 100 g/m²
    2nd coat, weight approx. 200 g/m²
Underneath: 1 coat, weight approx. 150 g/m²
Crosslinking temperature: 140°-150°-160° C.
Residence time: 2 minutes The coating did not show any levelling faults on top or underneath. The surface of the coating was mattsilver-grey without any craters or bubbles.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A coated substrate wherein the substrate comprises a member selected from the group consisting of textile substrates and surface-textured, sheet-form materials and wherein said coating comprises a high-solids polyurethane reactive coating system based on blocked NCO-prepolymers, polyamines and optionally, solvents, said coating system containing a leveller agent comprising:
   (1) a combination of about 1 to 10% by weight of (A) vinyl polymers and copolymers based on (meth)acrylic acid esters and, optionally, other vinyl comonomers and from about 0.1 to 2.0% by weight of (B) polysiloxanes,
   (2) from about 0.2 to 2.0% by weight of (C) poly(meth)acrylic acid (hydroxy)alkyl ester graft polymers on mixtures of dimethylpolysiloxanes containing vinyl residues and SiH-containing dimethylpolysiloxanes,
   (3) mixtures of (A), (B) and (C) in the amounts specified,
   (4) mixtures of (A) and (C) in the amounts specified or
   (5) mixtures of (B) and (C) in the amounts specified.

2. The coated substrate of claim 1 wherein said substrate is a textile substrate and wherein both sides are coated using coating weights of 100 g/m$^2$ or greater.

3. The coated substrate of claim 2 wherein said coating weight is 100 to about 1000 g/m$^2$.

4. The coated substrate of claim 1 wherein said substrate is a surface-textured, sheet-form material which is velour leather.

5. The coated substrate of claim 1 wherein the polysiloxanes (B) are polyalkylene oxide/polysiloxane copolymers.

6. A coated substrate wherein the substrate comprises a member selected from the group consisting of textile substrates and surface-textured, sheet-form materials and wherein said coating comprises a high-solids polyurethane reactive coating system based on blocked NCO-prepolymers, polyamines and, optionally, solvents, said coating system containing a leveller agent comprising:
   (1) a combination of from about 2 to 5% by weight of (A) vinyl polymers and copolymers based on (meth)acrylic acid esters and, optionally, other vinyl comonomers and from about 0.2 to 1.0% by weight of (B) polysiloxanes,
   (2) from about 0.2 to 2.0% by weight of (c) poly(meth)acrylic acid (hydroxy)alkyl ester graft polymers on mixtures of dimethylpolysiloxanes containing vinyl residues and SiH-containing dimethylpolysiloxanes,
   (3) mixtures of (A), (B) and (C) in the amounts specified,
   (4) mixtures of (A) and (C) in the amounts specified, or
   (5) mixtures of (B) and (C) in the amounts specified.

7. The coated substrate of claim 6 wherein said substrate is a textile substrate and wherein both sides are coated using coating weights of 100 g/m$^2$ or greater.

8. The coated substrate of claim 7 wherein said coating weight is 100 to about 1000 g/m$^2$.

9. The coated substrate of claim 6 wherein said substrate is a surface-textured, sheet-form material which is velour leather.

10. The coated substrate of claim 6 wherein the polysiloxanes (B) are polyalkylene oxide/polysiloxane copolymers.

11. A coated substrate wherein the substrate comprises a member selected from the group consisting of textile substrates and surface-textured, sheet-form materials and wherein said coating comprises a high-solids polyurethane reactive coating system based on blocked NCO-prepolymers, polyamines and, optionally, solvents, said coating system containing a leveller agent comprising:
   (1) a combination of from about 2 to 5% by weight of (A) vinyl polymers and copolymers based on (meth)acrylic acid esters and, optionally, other vinyl comonomers wherein (A) is dissolved to form an about 10 to 70% by weight solution and from about 0.2 to 1.0% by weight of (B) polysiloxanes wherein (B) is dissolved to form at least about 20% by weight solution,
   (2) from about 0.2 to 2.0% by weight of (C) poly(meth)acrylic acid (hydroxy)alkyl ester graft polymers on mixtures of dimethylpolysiloxanes containing vinyl residues and SiH-containing dimethylpolysiloxanes wherein (C) is dissolved to form at least about a 20% by weight solution,
   (3) mixtures of (A), (B) and (C) in the amounts specified,
   (4) mixtures of (A) and (C) in the amounts specified or
   (5) mixtures of (B) and (C) in the amounts specified.

12. The coated substrate of claim 11 wherein said substrate is a textile substrate and wherein both sides are coated using coating weights of 100 g/m$^2$ or greater.

13. The coated substrate of claim 12 wherein said coating weight is 100 to about 1000 g/m$^2$.

14. The coated substrate of claim 11 wherein said substrate is a surface-textured, sheet-form material which is velour leather.

15. The coated substrate of claim 11 wherein the polysiloxanes (B) are polyalkylene oxide/polysiloxane copolymers.

16. A coated substrate wherein the substrate comprises a member selected from the group consisting of textile substrates and surface-textured, sheet-form materials and wherein said coating comprises a high-solids polyurethane reactive coating system based on blocked NCO-prepolymers, polyamines and, optionally, solvents, said coating system containing a leveller agent comprising:
   (1) A combination of about 2 to 5% by weight of (A) vinyl polymers and copolymers based on (meth)arcylic acid esters and, optionally, other vinyl comonomers wherein said vinyl polymers and copolymers comprise poly(meth)acrylic acid butyl ester and from about 0.2 to 1.0% by weight of (B) dimethylpolysiloxane and/or ethoxylated dimethylpolysiloxane,
   (2) from about 0.2 to 2.0% by weight of (C) poly(meth)acrylic acid (hydroxy) butyl ester graft polymers on dimethylpolysiloxanes containing vinyl residues and SiH-containing dimethylpolysiloxanes,
   (3) mixtures of (A), (B) and (C) in the amounts specified, (4) mixtures of (A) and (C) in the amounts specified or (5) mixtures of (B) and (C) in the amounts specified.

17. The coated substrate of claim 16 wherein said substrate is a textile substrate and wherein both sides are coated using coating weights of 100 g/m² or greater.

18. The coated substrate of claim 17 wherein said coating weight is 100 to about 1000 g/m².

19. The coated substrate of claim 16 wherein said substrate is a surface-textured, sheet-form material which is velour leather.

20. The coated substrate of claim 16 wherein the polysiloxanes (B) are polyalkylene oxide/polysiloxane copolymers.

* * * * *